(12) United States Patent
Okamura

(10) Patent No.: US 9,885,898 B2
(45) Date of Patent: Feb. 6, 2018

(54) FRONT PANEL WITH DESIGN SHEET AND MANUFACTURING METHOD OF FRONT PANEL WITH DESIGN SHEET

(71) Applicant: FANUC Corporation, Yamanashi (JP)

(72) Inventor: Hideki Okamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 65 days.

(21) Appl. No.: 14/978,668

(22) Filed: Dec. 22, 2015

(65) Prior Publication Data
US 2016/0187712 A1 Jun. 30, 2016

(30) Foreign Application Priority Data
Dec. 24, 2014 (JP) .................................. 2014-260566

(51) Int. Cl.
*G02F 1/1333* (2006.01)
*G06F 3/041* (2006.01)

(52) U.S. Cl.
CPC ...... *G02F 1/133308* (2013.01); *G06F 3/0412* (2013.01); *G02F 2001/13332* (2013.01); *G02F 2001/133331* (2013.01); *G02F 2201/50* (2013.01); *G02F 2202/28* (2013.01)

(58) Field of Classification Search
CPC .......................... G02F 1/133308; G06F 3/0412
See application file for complete search history.

(56) References Cited

U.S. PATENT DOCUMENTS

| | | | | |
|---|---|---|---|---|
| 7,920,225 B2* | 4/2011 | Nishikawa | ............ | G06F 1/1626 349/11 |
| 7,944,521 B2* | 5/2011 | Ichioka | ............. | G02F 1/133308 349/122 |
| 2008/0246741 A1 | 10/2008 | Hinata | | |
| 2009/0103257 A1* | 4/2009 | Maeda | .................. | G06F 1/1616 361/679.27 |
| 2009/0284487 A1* | 11/2009 | Nakanishi | ............... | G06F 3/045 345/173 |
| 2010/0033447 A1* | 2/2010 | Horie | ...................... | G06F 3/041 345/174 |
| 2010/0165594 A1* | 7/2010 | Kim | ....................... | H05K 1/147 361/809 |

(Continued)

FOREIGN PATENT DOCUMENTS

| | | | | |
|---|---|---|---|---|
| CN | 102508571 A | | 6/2012 | |
| CN | 203350833 | * | 12/2013 | ............. G06F 3/041 |

(Continued)

OTHER PUBLICATIONS

Office Action in JP Application No. 2014-260566, dated Feb. 9, 2016.

(Continued)

*Primary Examiner* — Sang V Nguyen
(74) *Attorney, Agent, or Firm* — Hauptman Ham, LLP

(57) ABSTRACT

In a front panel in which a design sheet, a touch panel, and a metal sheet are integrated, the touch panel is bonded to a back face of the design sheet with an optical transparent double-sided tape. The metal sheet is formed in a frame shape to surround a periphery of the touch panel and to have an outer shape which is identical to an outer shape of the design sheet and is bonded to the back face of the design sheet with an adhesive or a double-sided tape.

11 Claims, 5 Drawing Sheets

(56) References Cited

U.S. PATENT DOCUMENTS

| | | | |
|---|---|---|---|
| 2012/0113027 A1 | 5/2012 | Song et al. | |
| 2012/0250276 A1* | 10/2012 | Nakajima | G06F 1/1626 |
| | | | 361/752 |
| 2013/0033658 A1* | 2/2013 | Kato | G02F 1/13452 |
| | | | 349/60 |
| 2014/0198060 A1* | 7/2014 | Wu | G06F 3/0412 |
| | | | 345/173 |
| 2014/0268623 A1* | 9/2014 | Kim | H05K 7/14 |
| | | | 361/809 |
| 2015/0256658 A1* | 9/2015 | Shin | G06F 1/1637 |
| | | | 455/566 |

FOREIGN PATENT DOCUMENTS

| | | | | |
|---|---|---|---|---|
| CN | 203350833 U | | 12/2013 | |
| CN | 103562826 | | 2/2014 | |
| JP | 2007-241811 | * | 9/2007 | G06F 3/041 |
| JP | 2007-293488 A | | 11/2007 | |
| JP | 2012-103658 A | | 5/2012 | |
| JP | 2014-102804 A | | 6/2014 | |

OTHER PUBLICATIONS

Office Action in CN Application No. 201510964608.0, dated Mar. 13, 2017.
Office Action in DE Application No. 102015016410.4, dated Aug. 23, 2017, 10 pp.

* cited by examiner

FRONT PANEL WITH DESIGN SHEET AND MANUFACTURING METHOD OF FRONT PANEL WITH DESIGN SHEET

RELATED APPLICATIONS

The present application claims priority to Japanese Application Number 2014-260566, filed Dec. 24, 2014, the disclosure of which is hereby incorporated by reference herein in its entirety.

BACKGROUND OF THE INVENTION

1. Field of the Invention

The present invention relates to a front panel which is used for a display device of various types of devices such as a control device.

2. Description of the Related Art

To a display device, a design sheet which is composed of a thin sheet (a polyethylene terephthalate (PET) sheet) is bonded to a front face of the display device so as to protect a touch panel or a transparent plate for protecting a liquid crystal display panel (hereinafter merely referred to as touch panel) which is provided to the display device and so as to add a design to the display device. A display screen such as a liquid crystal display (LCD) can be viewed from the outside through this design sheet and the touch panel. Accordingly, a wrinkle or peel-off generated on this design sheet interferes with precise observation of the display screen. Meanwhile, when a thermal expansion rate of the design sheet and a thermal expansion rate of a member used for bonding the design sheet are different from each other, temperature change of an installation environment causes generation of a wrinkle or peel-off of the design sheet.

Japanese Patent Application Laid-Open No. 2007-293488 discloses such configuration that a metal material, a thermal expansion rate of which is equivalent to that of a design sheet, is provided on a housing of a display device and the design sheet is bonded to the metal material so as to eliminate such difference between thermal expansion rates of the design sheet and a member for bonding the design sheet.

FIG. 9 is a schematic view illustrating a front panel, according to a first prior art example, in which generation of a wrinkle or peel-off of a design sheet is prevented and which is described in the patent document mentioned above.

In this prior art front panel, a design sheet 2 protrudes to the outside more than an outer edge of a touch panel or a transparent plate for protecting a liquid crystal display panel (hereinafter, referred to merely as a touch panel) 3. This protruding portion of the design sheet 2 is bonded to a metal sheet 4, which is formed integrally with a housing 9 of a display device, with a double-sided tape 5 or the like. A liquid crystal display (LCD) 8 is disposed on a back face of the touch panel 3, and thus the front panel is configured so that an LCD display region 8a of the LCD 8 can be observed from the outside through a transparent display region A of the design sheet 2. Here, a reference numeral 19 denotes a double-sided tape or an adhesive which bonds the touch panel 3 with the housing 9.

In this front panel of FIG. 9, the design sheet 2 is not bonded to the housing 9 which is made of resin or the like but to the metal sheet 4 a thermal expansion rate of which is equivalent to that of the design sheet 2. Therefore, the design sheet 2 and the metal sheet 4 expand and contract approximately equally with respect to temperature change of an installation environment, so that generation of a wrinkle or peel-off of the design sheet 2 can be prevented.

FIG. 10 is a schematic view illustrating a front panel, according to another prior art example, in which generation of a wrinkle of a design sheet is prevented.

In this prior art front panel, a face of a touch panel 3 and a face of a design sheet 2 are configured to have identical dimensions to each other and this design sheet 2 is bonded to the touch panel 3 with an optical transparent double-sided tape 6. Further, a bottom face (a face opposite to a face on which the design sheet 2 is bonded) of the touch panel 3 is bonded to a housing 9 of a display device with a double-sided tape or an adhesive 19. Further, a liquid crystal display (LCD) 8 is disposed on a back face of the touch panel 3, and thus the front panel is configured so that an LCD display region 8a of the LCD 8 can be observed from the outside through a transparent display region A of the design sheet 2.

In this prior art example illustrated in FIG. 10, the design sheet 2 is bonded to the touch panel 3 with the optical transparent double-sided tape 6 so as to prevent generation of a wrinkle and further, deflection of the design sheet 2.

In the prior art technique, such as the technique illustrated in FIG. 9, in which a front panel is formed such that the design sheet, which protrudes to the outside more than an outer edge of a touch panel (or a transparent plate for protecting a liquid crystal display panel), is bonded to a housing or the like of a display device, the design sheet is bonded to a metal sheet of the housing to cover the touch panel after the front panel is attached to the housing and assembled. Therefore, it is difficult to align bonding end faces of the metal sheet (housing) and the design sheet and the metal sheet and the design sheet may be bonded with misalignment.

Further, a slight difference in level is generated between a surface of the metal sheet of the housing and a surface of the touch panel due to tolerance or the like. The design sheet is a thin sheet the rigidity of which is extremely low, so that the slight difference in level is directly reflected as a difference in level on a surface of the design sheet to cause degradation of quality of the display device.

Further, in order to bond the design sheet onto the touch panel with the optical transparent double-sided tape as a prior art technique such as the technique illustrated in FIG. 10, it is necessary to eliminate bubbles from a bonding face and bond the design sheet to the touch panel or the transparent plate for protecting a liquid crystal display panel with the optical transparent double-sided tape. Therefore, processing using a bonding apparatus is required. However, in the prior art method in which a unit is configured by sequentially mounting a housing, a metal sheet, and a design sheet, a bonding apparatus is not able to be used and thus, it is impossible to bond the design sheet while eliminating bubbles from a bonding face of an optical transparent double-sided tape.

Further, an optical transparent double-sided tape is made of a soft material. In a front panel, which is used in a bad environment such as in a display device of a machine which is installed in such environment that a cutting fluid scatters, for example, a cutting fluid or the like may attach on a bonding end face of an optical transparent double-sided tape. Thus, there is a concern about durability of the bonding end face of the optical transparent double-sided tape.

SUMMARY OF THE INVENTION

It is an object of the present invention is to provide a front panel which remedies the above-described defects of the prior art examples, suppresses generation of a wrinkle and peel-off of a design sheet, is capable of easily preventing misalignment of a bonding position and generation of a difference in level in bonding of the design sheet, is superior in durability, and enables formation of a high-quality display device.

A front panel with a design sheet according to the present invention includes a design sheet, a touch panel or a transparent plate for protecting a liquid crystal display panel, and a metal sheet, wherein the metal sheet is formed in a frame shape to surround a periphery of the touch panel or the transparent plate for protecting a liquid crystal display panel and to have an outer shape which is identical to an outer shape of the design sheet, the touch panel or the transparent plate for protecting a liquid crystal display panel is bonded to a back face of the design sheet which includes a transparent display region, with an optical transparent double-sided tape or an optical transparent adhesive, the metal sheet having the frame shape is bonded to the back face of the design sheet with an adhesive or a double-sided tape, and the design sheet, the touch panel or the transparent plate for protecting a liquid crystal display panel, and the metal sheet are integrated.

A double-sided tape or a sheet may be bonded to a peripheral edge portion of a back face of the touch panel or the transparent plate for protecting a liquid crystal display panel and a back face of the metal sheet.

A boss for attaching the front panel with a design sheet to a housing can be provided to the back face of the metal sheet.

A boss for attaching a component for attaching the front panel with a design sheet to an inside of a display device can be provided to the back face of the metal sheet.

A method for manufacturing a front panel with a design sheet according to the present invention includes steps of: fixing a touch panel or a transparent plate for protecting a liquid crystal display panel to a back face of a design sheet which includes a transparent display region, with an optical transparent double-sided tape or an optical transparent adhesive; placing the design sheet on a smooth work table so that a surface of the design sheet faces the work table; step of fixing a metal sheet that is formed in a frame shape to surround a periphery of the touch panel or the transparent plate for protecting a liquid crystal display panel and has an outer shape which is identical to an outer shape of the design sheet, to a back face of the design sheet that protrudes from an outer edge portion of the touch panel or the transparent plate for protecting a liquid crystal display panel, with an adhesive or a double-sided tape, so that the metal sheet is aligned with the outer shape of the design sheet; and integrating the design sheet, the touch panel or the transparent plate for protecting a liquid crystal display panel, and the metal sheet.

In the present invention, before the front panel is attached to the housing of the display device, the front panel is integrated as the front panel with a design sheet. Therefore, in the manufacturing of the front panel with a design sheet, bonding processing of the metal sheet can be performed by placing the design sheet, to which the touch panel (or the transparent plate for protecting a liquid crystal display panel) is bonded, on a smooth surface plate (reference face). Accordingly, a display face of the front panel can be formed to be a smooth face without generating a difference in level between the touch panel and the metal sheet. Further, positioning of outer-shape end faces of respective members to be bonded such as the metal sheet and the touch panel can be performed by using a jig or the like, so that the end faces of respective members can be precisely aligned.

Further, before the front panel is attached to the housing of the display device, the front panel is integrated as the front panel with a design sheet, so that an operation in which the design sheet is bonded with the touch panel or the transparent plate for protecting a liquid crystal display panel with the optical transparent double-sided tape can be performed by using an optical transparent double-sided tape bonding apparatus. Therefore, a front panel with a design sheet in which no bubbles remain on a bonding face can be manufactured. Further, the touch panel or the transparent plate for protecting a liquid crystal display panel is surrounded by the metal sheet provided in the periphery thereof and the design sheet and the metal sheet are fixed by an adhesive, a double-sided tape, or the like which exhibits high durability, such as cutting fluid resistance, against an installation environment. Therefore, end faces of the touch panel or the transparent plate for protecting a liquid crystal display panel and the optical transparent double-sided tape are protected from outside air, improving durability. Further, there is a small difference in thermal expansion rate between the design sheet and the metal sheet, so that it is not necessary to use a soft adhesive or double-sided tape considering stress relaxation and an adhesive material which exhibits high durability, such as cutting fluid resistance, against an installation environment can be used.

BRIEF DESCRIPTION OF THE DRAWINGS

The forgoing and other objects and feature of the invention will be apparent from the following description of preferred embodiments of the invention with reference to the accompanying drawings, in which:

FIG. 7A and FIG. 7B are perspective views of the front panel with a design sheet illustrated in FIG. 5, in which FIG. 7A is a drawing viewing a top face of the front panel with a design sheet (design sheet side) and FIG. 7B is a drawing viewing a bottom face of the front panel with a design sheet;

DETAILED DESCRIPTION OF THE PREFERRED EMBODIMENTS

A front panel with a design sheet according to a first embodiment of the present invention is first described with reference to FIG. 1 and FIG. 2.

Figure 1:
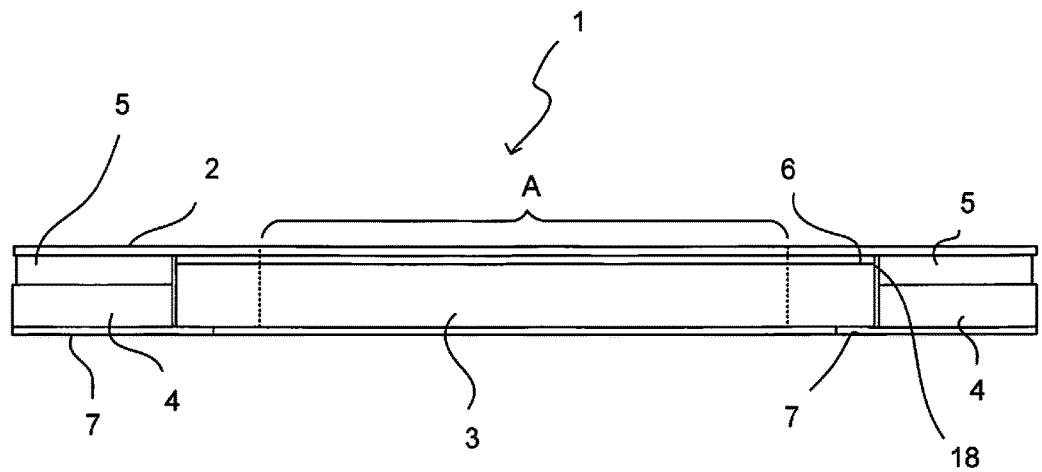
FIG. 1 is a schematic view illustrating a front panel with a design sheet according to a first embodiment of the present invention.

FIG. 1 is a schematic view illustrating the front panel with a design sheet according to the first embodiment of the present invention.

A design sheet 2 is formed to protrude toward the outside more than an outer edge of a touch panel or a transparent plate for protecting a liquid crystal display panel (hereinafter, referred to merely as a touch panel) 3 and is bonded to the touch panel 3 with an optical transparent double-sided tape 6.

A metal sheet 4 is formed in a frame shape to surround the touch panel 3 and an outer shape of the metal sheet 4 is same as an outer shape of the design sheet 2. The metal sheet 4 is bonded to a portion, which protrudes toward the outside more than the outer edge of the touch panel 3, of the design sheet 2 with an adhesive or a double-sided tape 5 (illustrated as a double-sided tape in the drawing). Further, to a bottom face of the metal sheet 4 and a peripheral edge portion of a bottom face of the touch panel 3 (faces opposite to faces on which the design sheet 2 is bonded), a fixing member 7 which is composed of a double-sided tape, a sheet, or the like and has a frame shape is bonded. Thus, a front panel 1 with a design sheet is configured such that the design sheet 2, the touch panel 3, and the metal sheet 4 are integrated in such a manner that the fixing member 7 and the design sheet 2 sandwich the touch panel 3 and the metal sheet 4. In the front panel 1 with a design sheet, outer shapes of the design sheet 2, the metal sheet 4, and the fixing member 7 are configured to be approximately identical to each other (refer to FIG. 8 which will be described later). Here, the optical transparent double-sided tape 6 is used for bonding of the design sheet 2 and the touch panel 3 in the front panel 1 of FIG. 1. However, an optical transparent adhesive may be used instead of the optical transparent double-sided tape 6.

Figure 2:
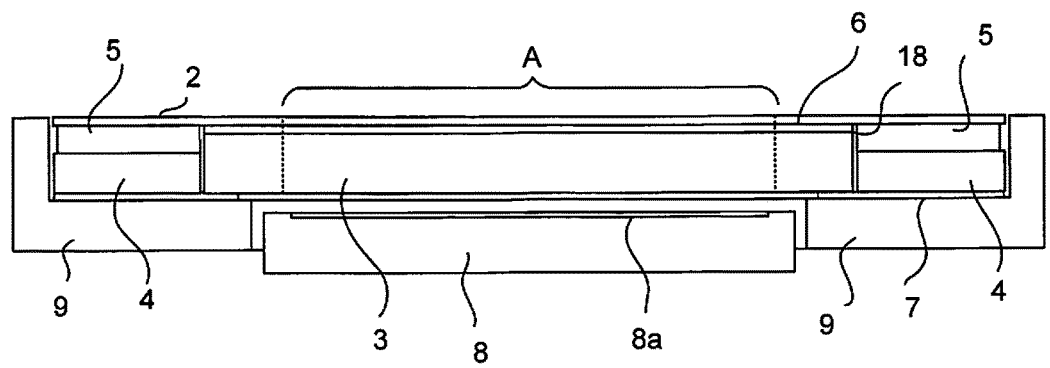
FIG. 2 illustrates a state in which the front panel with a design sheet of FIG. 1 is mounted on a housing of a display device.

FIG. 2 illustrates a state in which the front panel 1 with a design sheet (FIG. 1), which is configured such that the design sheet 2, the touch panel 3, and the metal sheet 4 are integrated, is mounted on a housing 9 of a display device.

A peripheral portion of the front panel 1 with a design sheet, which is integrated as described above, is bonded and fixed to the housing 9 with the fixing member 7 so that a liquid crystal display (LCD) display region 8a of a LCD 8 which is provided to the housing 9 can be observed from the outside through a transparent display region A of the design sheet 2. In a case where the fixing member 7 is a double-sided tape, the front panel 1 with a design sheet which is integrated is fixed to the housing 9 through the double-sided tape. In a case where the fixing member 7 is composed of a sheet, the front panel 1 with a design sheet is fixed to the housing 9 with an adhesive.

The design sheet 2 is bonded to the touch panel 3 with the optical transparent double-sided tape 6 before the front panel 1 is attached to the housing 9, so that the design sheet 2 can be bonded to the touch panel 3 by using an optical transparent double-sided tape bonding apparatus while eliminating bubbles.

Further, the touch panel 3 and an end face 18 of the optical transparent double-sided tape 6 which is bonded on the touch panel 3 are surrounded by the design sheet 2, the metal sheet 4, the double-sided tape 5, and the fixing member 7, so that the touch panel 3 and the end face 18 of the optical transparent double-sided tape 6 are not brought into contact with outside air. Consequently, the end face of the optical transparent double-sided tape 6 is protected from outside air and degradation of durability can be prevented. Further, the double-sided tape 5 or an adhesive which has high durability against an environment in which the front panel 1 is used may be used depending on the environment. For example, when the front panel 1 with a design sheet illustrated in FIG. 2 is used for a display device of a machine, the double-sided tape 5 or an adhesive which has high resistance against a cutting fluid may be used.

A front panel with a design sheet according to a second embodiment of the present invention is now described with reference to FIG. 3 and FIG. 4.

Figure 3:
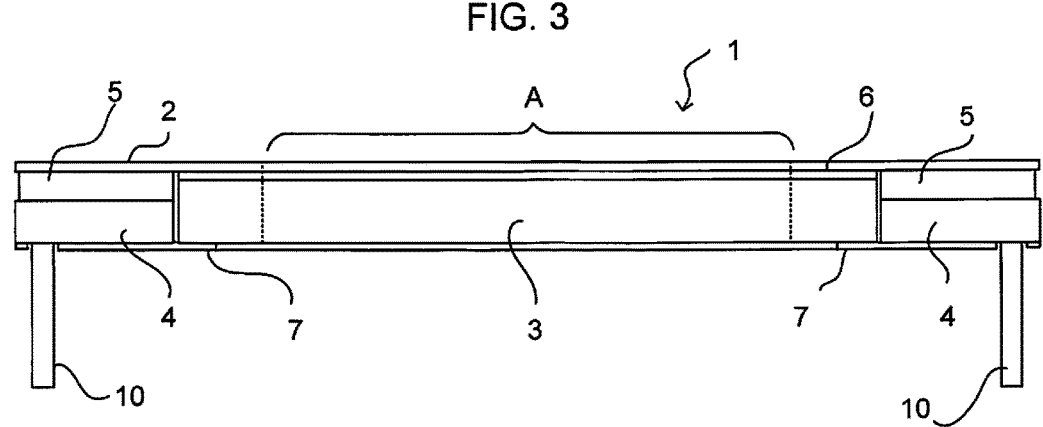
FIG. 3 is a schematic view illustrating a front panel with a design sheet according to a second embodiment of the present invention.

FIG. 3 is a schematic view illustrating the front panel with a design sheet according to the second embodiment of the present invention.

In this second embodiment, a boss 10 which is used for attaching a front panel 1 with a design sheet to the housing 9 of a display device is added to the front panel 1 with a design sheet of the first embodiment (FIG. 1). That is, a plurality of bosses 10 are provided in an erected manner on a bottom face (a face opposite to a face on which the design sheet 2 is bonded) of the metal sheet 4 which constitutes the front panel 1 (refer to FIG. 8).

Figure 4:
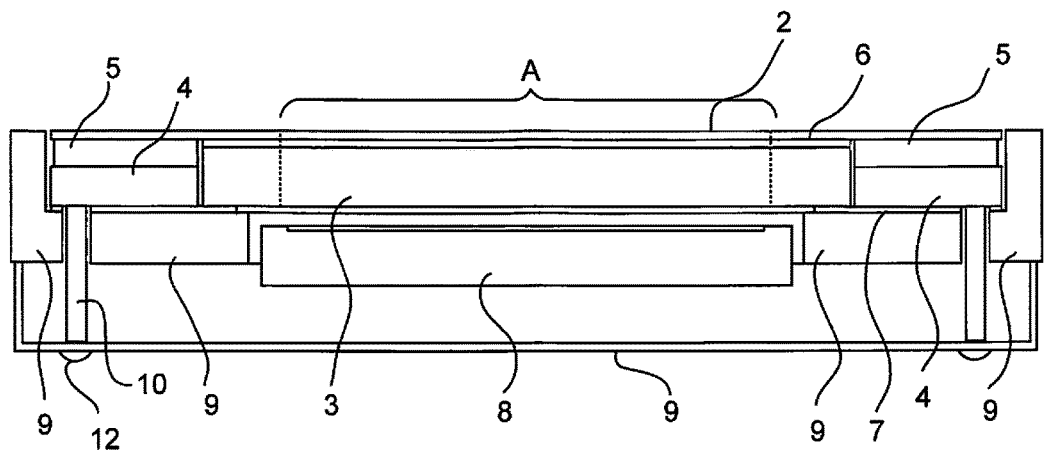
FIG. 4 illustrates a state in which the front panel with a design sheet of FIG. 3 is mounted on a housing of a display device.

FIG. 4 illustrates a state in which the front panel 1 which is illustrated in FIG. 3 and includes the metal sheet 4 on which a plurality of bosses 10 are provided in an erected manner is mounted on the housing 9 of a display device.

The bosses 10 (which are provided on the metal sheet 4 in an erected manner) of the front panel 1 with a design sheet illustrated in FIG. 3 are fixed to the housing 9 of the display device with bolts 12 as illustrated in FIG. 4 so as to incorporate the front panel 1 with a design sheet of FIG. 3 into the housing 9 of the display device.

In this embodiment, the front panel 1 with a design sheet can be fixed to the housing 9 not only by the fixing member 7 which is a double-sided tape or an adhesive but also by the bosses 10 and the bolts 12. In a case where a sheet is used as the fixing member 7, when the sheet is not bonded to the housing 9 and the front panel 1 with a design sheet is fixed to the housing 9 of the display device only by the bosses 10 and the bolts 12, the front panel 1 with a design sheet can be detached from the housing 9 only by detaching the bolts 12.

A front panel with a design sheet according to a third embodiment of the present invention is now described with reference to FIG. 5, FIG. 6, FIG. 7A, and FIG. 7B.

Figure 5:
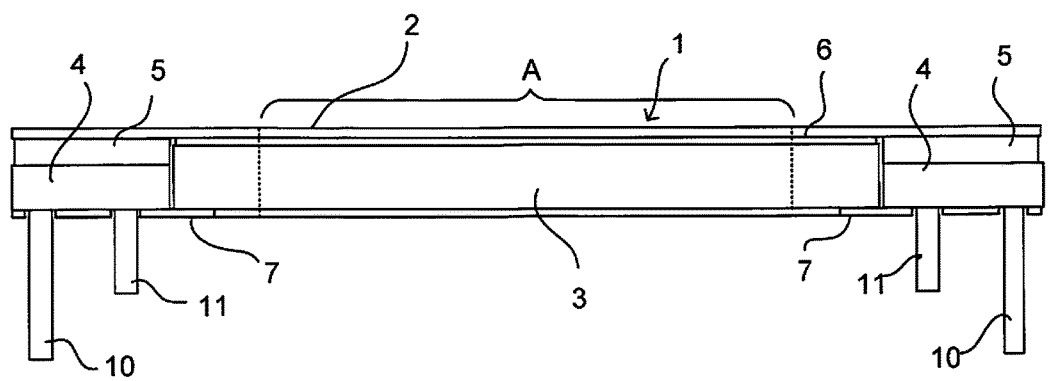
FIG. 5 is a schematic view illustrating a front panel with a design sheet according to a third embodiment of the present invention.

FIG. 5 is a schematic view illustrating the front panel with a design sheet according to the third embodiment of the present invention.

In this third embodiment, a boss 11 which is used for attaching a component, which is attached to the inside of a display device, is provided to the front panel 1 with a design sheet (FIG. 3) of the second embodiment. That is, a plurality of bosses 11 for attaching a component are provided in an erected manner on a bottom face (a face opposite to a face on which the design sheet 2 is bonded) of the metal sheet 4, which constitutes the front panel 1, other than the bosses 10 (FIG. 4) (refer to FIG. 8).

Figure 6:
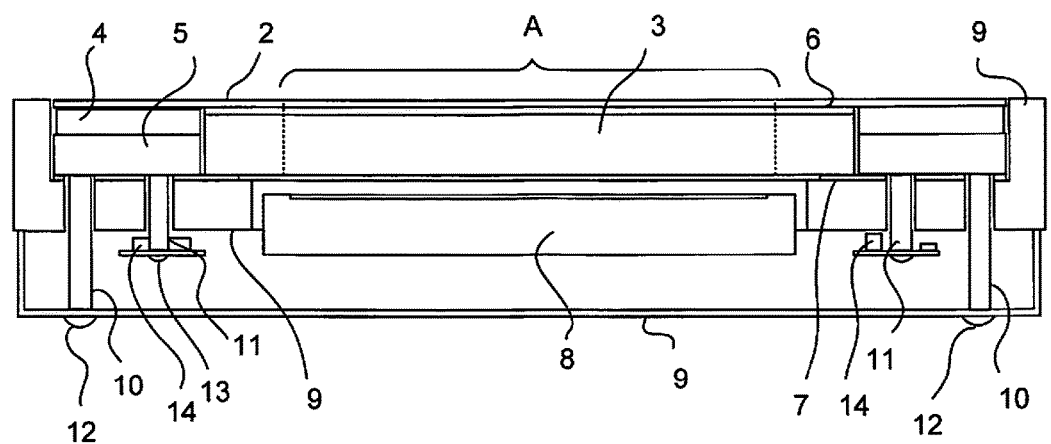
FIG. 6 illustrates a state in which the front panel with a design sheet of FIG. 5 is mounted on a housing of a display device.

FIG. 6 illustrates a state in which the front panel 1 which is illustrated in FIG. 5 and includes the metal sheet 4, on which the bosses 10 and the bosses 11 for attaching a component are provided in an erected manner, is mounted on the housing 9 of a display device.

The front panel 1 with a design sheet of FIG. 5 is attached to the housing 9 of the display device, then a plate to which a component 14 is attached is fixed, by a bolt 13, to the boss 11 for attaching a component and after that, the boss 10 is fixed, by a bolt 12, to the housing 9 of the display device. Thus, the front panel 1 with a design sheet of FIG. 5 is incorporated into the housing 9 of the display device.

In this embodiment, the boss 11 for attaching a component is provided to (the metal sheet 4 of) the front panel 1 and accordingly, the structural component of the inside of the display device is simplified and the number of components is reduced.

Here, a key switch is used for turning on/off a switch by pressing a key switch portion which is displayed on the design sheet 2. In order to precisely detect this pressing with high sensitivity and enable a worker to perceive his/her turning on/off of a switch (to obtain click feeling), it is necessary to precisely determine a position of a surface mounted component (especially, a position in a pressing direction) which is arranged in association with a key switch display portion of the design sheet 2. When this surface mounted component is arranged on the housing 9 side of the display device, dimensional management in the positioning becomes difficult. However, in the present embodiment, this surface mounted component is attached to the boss 11 which is provided to a component (the metal sheet 4) of the front panel 1 side, so that positioning of the surface mounted component is easier. Thus, according to the present embodiment, it is easier to precisely manage dimensions of a surface mounted component which is required to be precisely positioned with respect to the design sheet 2. Further, dimensional management of a position and a height of the boss 11 is almost the only thing required for the positioning of a surface mounted component, so that accumulated tolerance is reduced.

Here, only the boss 11 for attaching a component may be provided to the front panel 1 with a design sheet, with the boss 10 being not provided.

Figure 7A:
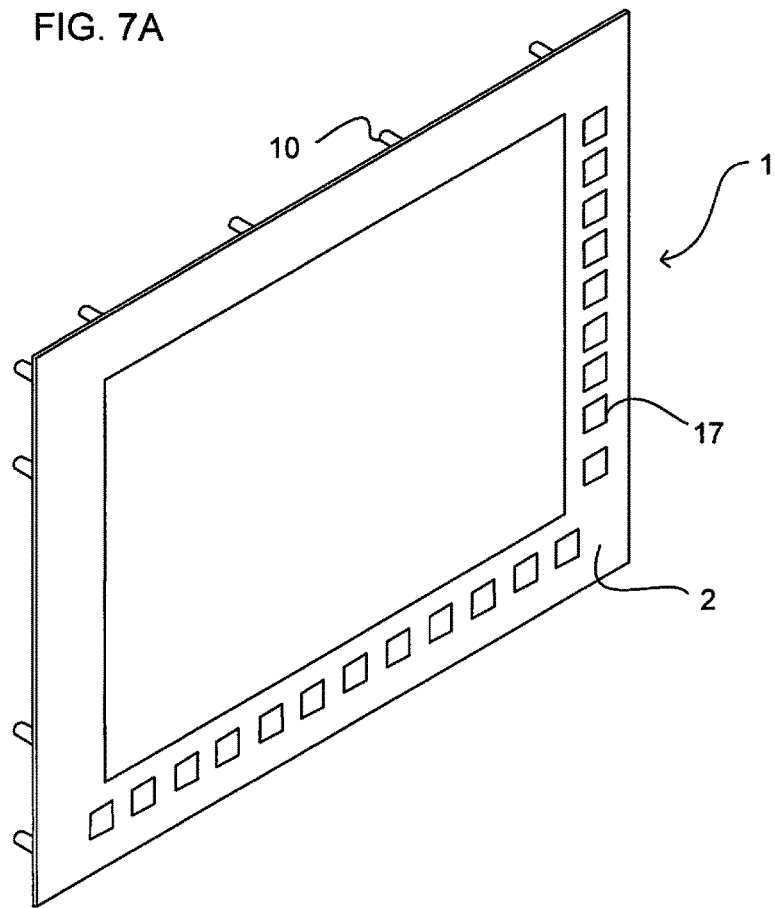
Figure 7B:
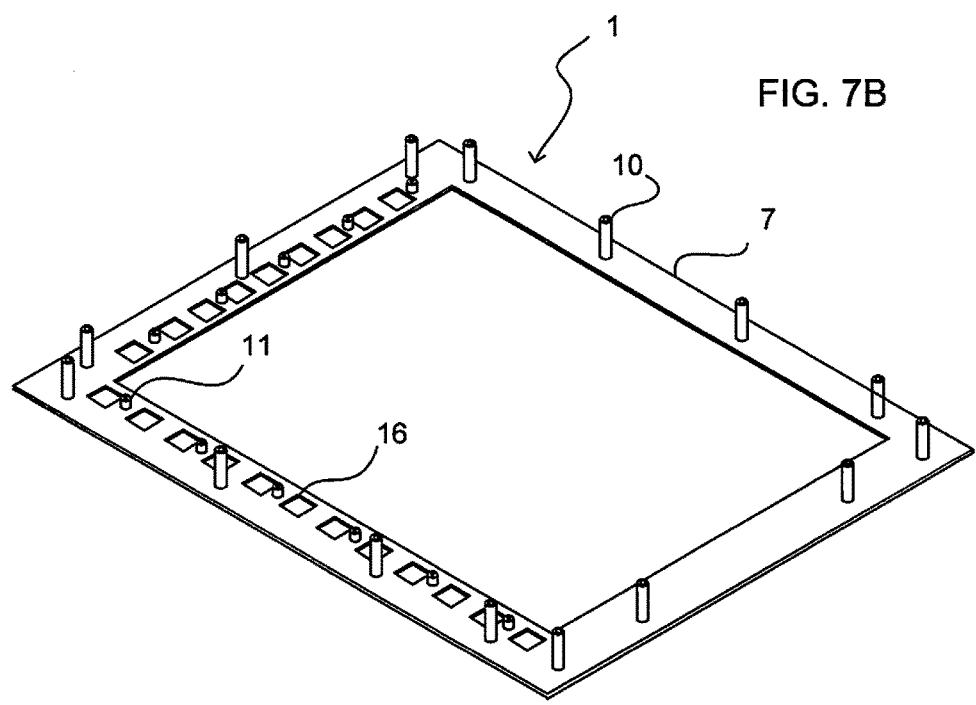

FIG. 7A and FIG. 7B are perspective views of the front panel 1 with a design sheet illustrated in FIG. 5. In FIG. 7B, a reference numeral 16 denotes a hole for a key switch of a display device. The hole 16 is formed on each of the double-sided tape 5, the metal sheet 4, and the fixing member 7. In FIG. 7A, a reference numeral 17 denotes an indication for a key switch. The indications 17 are provided on the design sheet 2 by printing or the like.

The front panel 1 with a design sheet according to the first embodiment described above (FIG. 1) corresponds to a front panel which is obtained by removing the bosses 10 and the bosses 11 from the front panel 1 with a design sheet which is illustrated in FIG. 7A and FIG. 7B, and the front panel 1 with a design sheet according to the second embodiment (FIG. 3) corresponds to a front panel which is obtained by removing the bosses 11 from the front panel 1 with a design sheet which is illustrated in FIG. 7A and FIG. 7B.

A method for manufacturing a front panel with a design sheet according to the present invention is now described with reference to FIG. 8.

Figure 8:
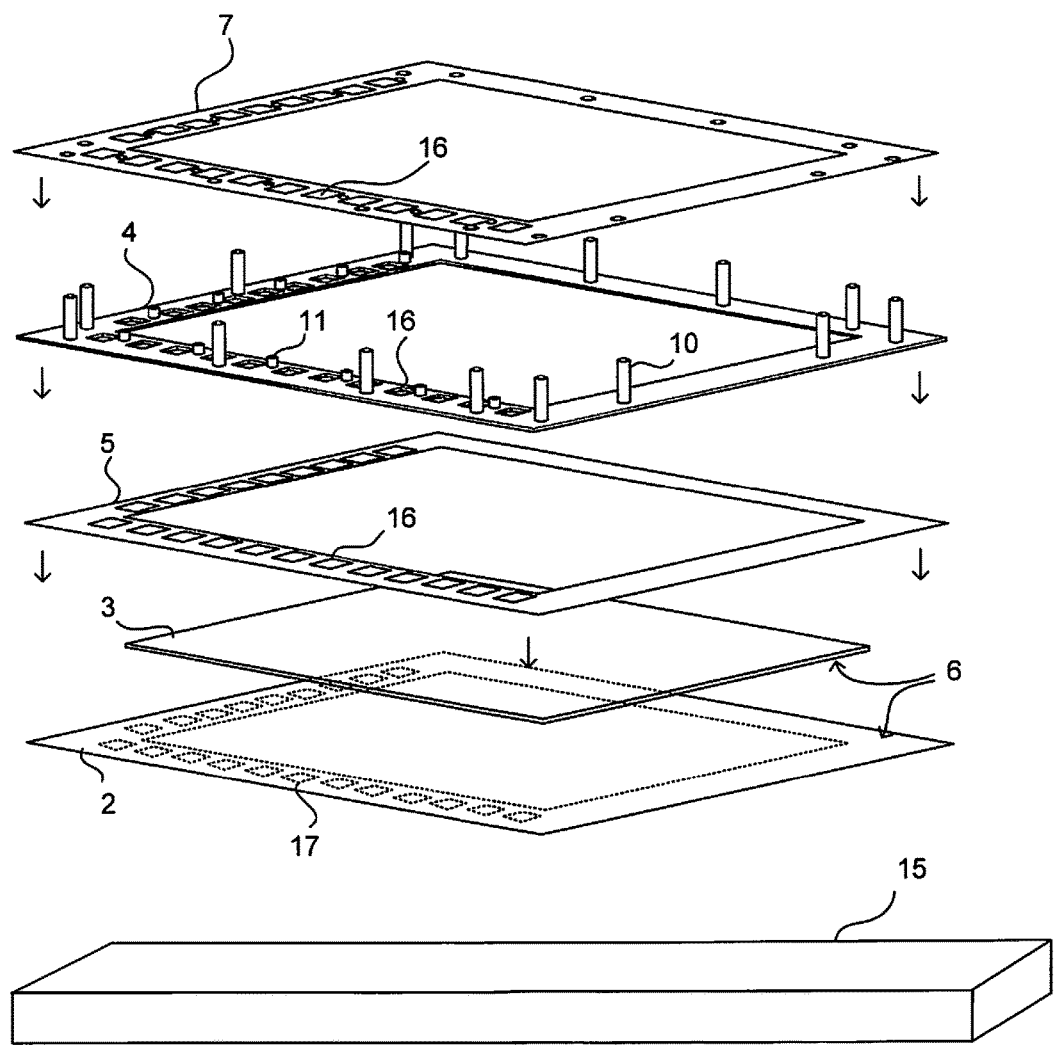
FIG. 8 illustrates a method for manufacturing a front panel with a design sheet according to the present invention.
Figure 9:
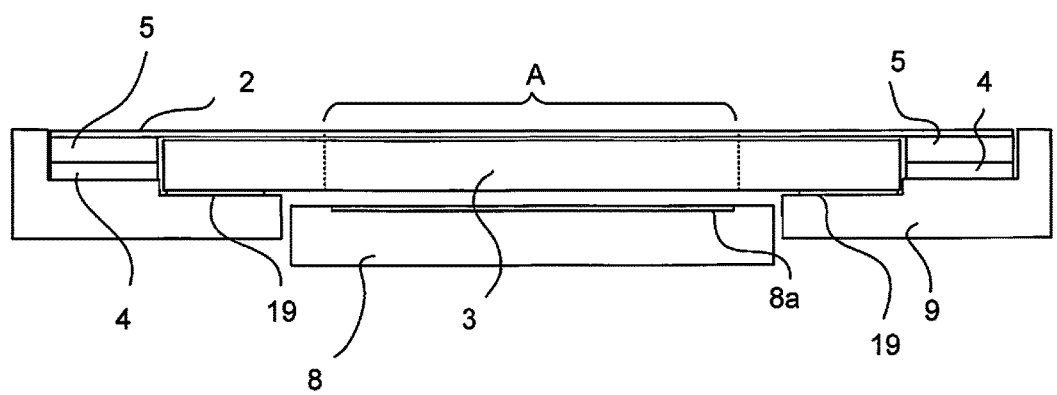
FIG. 9 is a schematic view illustrating a front panel, according to a first prior art example, on which generation of a wrinkle or peel-off of a design sheet is prevented.
Figure 10:
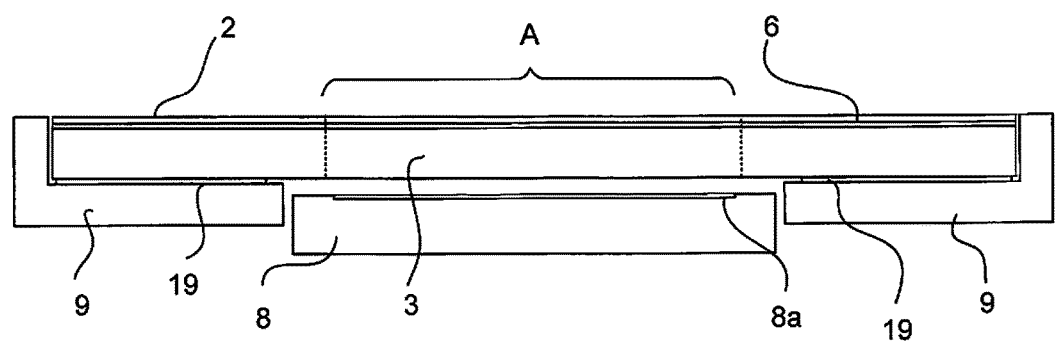
FIG. 10 is a schematic view illustrating a front panel, according to a second prior art example, on which generation of a wrinkle of a design sheet is prevented.

FIG. 8 illustrates a method for manufacturing the front panel 1 with a design sheet (the third embodiment) which is illustrated in FIG. 5 and includes the metal sheet 4 on which the bosses 10 and the bosses 11 for attaching a component are provided in an erected manner. The manufacturing method is identical to a method for manufacturing the front panel 1 with a design sheet (which does not include the bosses 11 for attaching a component) of the second embodiment and also identical to a method for manufacturing the front panel 1 with a design sheet (which does not include either the bosses 10 or the bosses 11 for attaching a component) of the first embodiment (nothing more than the difference in whether or not the bosses 10 and 11 are provided).

First, the touch panel 3 is positioned on the central portion of the bottom face (however, a top face in FIG. 8) of the design sheet 2 and the touch panel 3 is bonded to the design sheet 2 with the optical transparent double-sided tape 6, by using an optical transparent double-sided tape bonding apparatus (which is not illustrated in the drawing). Then, the design sheet 2 to which the touch panel 3 is bonded is placed on a smooth face of a work table 15 which constitutes a smooth surface plate. At this time, the design sheet 2 is placed such that the top face (however, the bottom face in FIG. 8) of the design sheet 2 is brought into contact with the smooth face of the work table 15 and the touch panel 3 is positioned on the upper side.

Then, the metal sheet 4 is bonded to a portion, which protrudes from the outer edge portion of the touch panel 3, of the design sheet 2 with the double-sided tape 5. After that, the fixing member 7 such as a double-sided tape and a sheet is bonded to the metal sheet 4 and the peripheral edge portion of the touch panel 3 so as to integrate the design sheet 2, the touch panel 3, and the metal sheet 4. Consequently, manufacturing of the "front panel with a design sheet" is ended.

In the manufacturing of the "front panel with a design sheet", the design sheet 2 and the touch panel 3 are first bonded to each other with the optical transparent double-sided tape 6. Therefore, this bonding operation can be performed by using an optical transparent double-sided tape bonding apparatus while removing bubbles from a bonding face. Further, the metal sheet 4 is bonded in such a manner that the design sheet 2 to which the touch panel 3 is bonded is placed on the work table 15 which is a smooth surface plate. Therefore, a surface of the design sheet 2 can be formed to be a smooth face based on the smooth face of the work table 15 without generating a difference in level between the touch panel 3 and the metal sheet 4.

Furthermore, in the operation of bonding the metal sheet 4 and the fixing member 7, positioning of outer-shape end faces of respective components can be easily performed by using a jig and the respective components can be bonded with high positioning precision without generating a position gap because the design sheet 2 is placed on the work table 15 which is a smooth surface plate.

In the respective embodiments described above, the front panel 1 with a design sheet is configured such that the design sheet 2, the touch panel 3, and the metal sheet 4 are integrated by bonding the fixing member 7 such as a double-sided tape and a sheet on a peripheral edge of the bottom face of the touch panel 3 and the bottom face of the metal sheet 4. However, the touch panel 3 and the metal sheet 4 are bonded to the design sheet 2 with the optical transparent double-sided tape 6, an adhesive, or the double-sided tape 5 to be integrated and finally attached and fixed to the housing 9 of the display device as illustrated in FIG. 2, FIG. 4, and FIG. 6. Therefore, it is not necessary to provide the fixing member 7.

Further, the front panel 1 with a design sheet which is integrated is carried and is incorporated into the housing 9 of the display device. Therefore, the bottom face of the touch panel 3 and the bottom face of the metal sheet 4 may be temporarily fixed by a temporary fixing material for the convenience of this operation. Then, when the front panel 1 with a design sheet is incorporated into the housing 9, the temporary fixing material may be removed and the front panel 1 with a design sheet may be attached to the housing 9.

The invention claimed is:

1. A front panel, comprising:
   a design sheet;
   a touch panel or a transparent plate for protecting a liquid crystal display panel; and
   a metal sheet; wherein
   the metal sheet has a frame shape to surround a periphery of the touch panel or the transparent plate and to have an outer shape which is identical to an outer shape of the design sheet,
   the touch panel or the transparent plate is bonded to a back face of the design sheet which includes a transparent display region, with an optical transparent double-sided tape or an optical transparent adhesive,
   the metal sheet having the frame shape is bonded to the back face of the design sheet with an adhesive or a double-sided tape,
   in a thickness direction of the design sheet, the metal sheet is at least partially co-elevational with the touch panel or the transparent plate, and
   the design sheet, the touch panel or the transparent plate, and the metal sheet are integrated.

2. A front panel with a design sheet, comprising:
   a design sheet;
   a touch panel or a transparent plate for protecting a liquid crystal display panel; and
   a metal sheet; wherein
   the metal sheet is formed in a frame shape to surround a periphery of the touch panel or the transparent plate for protecting a liquid crystal display panel and to have an outer shape which is identical to an outer shape of the design sheet,
   the touch panel or the transparent plate for protecting a liquid crystal display panel is bonded to a back face of the design sheet which includes a transparent display region, with an optical transparent double-sided tape or an optical transparent adhesive,
   the metal sheet having the frame shape is bonded to the back face of the design sheet with an adhesive or a double-sided tape,
   the design sheet, the touch panel or the transparent plate for protecting a liquid crystal display panel, and the metal sheet are integrated, and
   a double-sided tape or a sheet is bonded to a peripheral edge portion of a back face of the touch panel or the transparent plate for protecting a liquid crystal display panel and a back face of the metal sheet.

3. The front panel according to claim 1, further comprising:
   a boss for attaching the front panel with the design sheet to a housing,
   wherein the boss is provided to a back face of the metal sheet.

4. The front panel according to claim 1, further comprising:
   a boss for attaching a component for attaching the front panel with the design sheet to an inside of a display device,
   wherein the boss is provided to a back face of the metal sheet.

5. A method for manufacturing a front panel with a design sheet, comprising:
   fixing a touch panel or a transparent plate for protecting a liquid crystal display panel to a back face of the design sheet which includes a transparent region, with an optical transparent double-sided tape or an optical transparent adhesive;
   placing the design sheet on a smooth work table so that a front face of the design sheet faces the work table;
   fixing a metal sheet, that is formed in a frame shape to surround a periphery of the touch panel or the transparent plate and has an outer shape which is identical to an outer shape of the design sheet, to the back face of the design sheet that protrudes from an outer edge portion of the touch panel or the transparent plate, with an adhesive or a double-sided tape, so that the outer shape of the metal sheet is aligned with the outer shape of the design sheet and, in a thickness direction of the design sheet, the metal sheet has at least a portion at a same height as a portion of the touch panel or the transparent plate; and
   integrating the design sheet, the touch panel or the transparent plate, and the metal sheet.

6. The method according to claim 5, wherein
   a thickness of the optical transparent double-sided tape or the optical transparent adhesive that bonds the touch panel or the transparent plate to the back face of the design sheet is less than a thickness of the adhesive or the double-sided tape that bonds the metal sheet to the back face of the design sheet.

7. The method according to claim 6, wherein
   said integrating comprises bonding a fixing member to a back face of the metal sheet and to a peripheral edge portion of a back face of the touch panel or the transparent plate.

8. The method according to claim 5, wherein
   said integrating comprises bonding a fixing member to a back face of the metal sheet and to a peripheral edge portion of a back face of the touch panel or the transparent plate.

9. The front panel according to claim 1, wherein
   a thickness of the optical transparent double-sided tape or the optical transparent adhesive that bonds the touch panel or the transparent plate to the back face of the design sheet is less than a thickness of the adhesive or the double-sided tape that bonds the metal sheet to the back face of the design sheet.

10. The front panel according to claim 1, further comprising:
    a fixing member bonded to a back face of the metal sheet and to a peripheral edge portion of a back face of the touch panel or the transparent plate.

11. The front panel according to claim 10, further comprising:
    a thickness of the optical transparent double-sided tape or the optical transparent adhesive that bonds the touch panel or the transparent plate to the back face of the design sheet is less than a thickness of the adhesive or the double-sided tape that bonds the metal sheet to the back face of the design sheet.

* * * * *